United States Patent
Miklos

[11] Patent Number: 6,101,931
[45] Date of Patent: Aug. 15, 2000

[54] DISPOSABLE GRILL LINER

[76] Inventor: Edward J. Miklos, 5536 Clarendon Dr., Solon, Ohio 44139

[21] Appl. No.: 09/374,289

[22] Filed: Aug. 16, 1999

[51] Int. Cl.[7] .............................. F24B 13/02; A47J 27/00
[52] U.S. Cl. .................. 99/446; 99/400; 99/444; 126/9 A; 126/145
[58] Field of Search .......................... 99/446, 445, 444, 99/447, 400, 401, DIG. 15; 220/23.9; 126/145, 9 A, 25 R

[56] References Cited

U.S. PATENT DOCUMENTS

| | | | |
|---|---|---|---|
| D. 374,378 | 10/1996 | Hyden et al. | D7/402 |
| 2,673,003 | 3/1954 | Stewart | 126/9 A |
| 3,256,806 | 6/1966 | Jordan | 99/444 |
| 3,555,994 | 1/1971 | Nemetz et al. | 99/444 |
| 3,601,280 | 8/1971 | Mills | 99/444 |
| 3,613,555 | 10/1971 | Ogman | 99/446 |
| 4,763,639 | 8/1988 | Goldsworthy | 126/25 R |
| 4,877,010 | 10/1989 | Hait | 126/9 A |
| 4,969,449 | 11/1990 | Levin | 126/332 |
| 4,979,440 | 12/1990 | Latour et al. | 99/445 |
| 5,133,333 | 7/1992 | Stout | 126/25 R |
| 5,279,277 | 1/1994 | Barker | 126/25 R |
| 5,399,439 | 3/1995 | Rasmussen | 126/25 R |
| 5,447,097 | 9/1995 | Rhee | 99/450 |
| 5,586,491 | 12/1996 | Diller et al. | 99/450 |

*Primary Examiner*—Reginald L. Alexander
*Attorney, Agent, or Firm*—Vickers, Daniels & Young

[57] ABSTRACT

A disposable, flame-resistant grill liner, having one or more pleated sections to enable the grill liner to be conformed to the interior surfaces of a grill. The grill liner may include a burner slot to enable the grill liner to be used with gas or electric grills.

48 Claims, 3 Drawing Sheets

DISPOSABLE GRILL LINER

The present invention is particularly applicable to liners for grills and fires and more particularly to a liner for a barbeque or electrical grill liner positionable in the base and sides of the grill to protect the interior of the grill from dirt, drippings, grease and smoke.

BACKGROUND OF THE INVENTION

Grill covers and grill liners of various types have long been used to protect various components of the grill. These grill liners typically have one of two functions. One group of liners is designed to protect the bottom or bottom and sides of the interior of the grill from dirt, grease and the like so to maintain the cleanliness of the interior body of the grill. These grill liners are generally positioned in the base of the grill. The second group of liners is designed to protect or cover the metal wire rack to keep the rack clean and/or to maintain a sanitary cooking environment. These types of liners are generally placed on the surface of the metal wire rack.

Two types of grill liners that are designed to protect the bottom and/or sides of the grill are disclosed in U.S. Pat. No. 3,601,280 and U.S. Pat. No. Des. 374,378. Both of these liners are preformed circular liners designed to fit into the bottom of certain types of circular grills. The grill liner disclosed in the design patent only protects the bottom of the grill, whereas the grill liner disclosed in U.S. Pat. No. 3,601,280 protects both the bottom and sides of the grill.

Several types of grill liners that are designed to protect the metal wire rack of the grill by placing a material over the top of the metal wire rack surface are disclosed in U.S. Pat. Nos. 3,555,994; 3,613,555; 4,763,639; 4,969,449; 4,979,440; 5,399,439; 5,447,097; and 5,586,491. All of these grill liners include one or more openings to allow heat from the bottom of the grill to penetrate through the openings in order to cook the food on the surface of the liner.

Although the grill liners that are designed to be placed over the metal wire rack cooking surface protect the wire rack surface from dirt and grease, the grease is able to pass through the perforations in the grill liners and cake onto the interior surfaces of the grill. The grill liners which have heretofor been designed to be placed in the bottom of the grill are designed to conform to specific grill configurations, thus they cannot be used for different sized and configured grills. As a result, there is a need for a grill liner which can be used in a wide variety of grills and which protects the interior bottom and side grill surfaces from dirt, drippings, grease, soot and other undesirable materials from caking and/or adhering to the interior bottom and side surfaces of the grill.

SUMMARY OF THE INVENTION

The present invention pertains to a grill liner designed to reduce the clean-up of a grill after food has been prepared on the grill, and more particularly to a disposable grill liner positioned on the base and sides of the grill to prevent dirt, drippings, grease, soot and the like from adhering, staining and/or caking on the interior bottom and sides of the grill when the food is cooked in the grill. As can be appreciated, the invention has broader applications and can be used as a liner for a campfire, earth grill liner, heating source or the like.

The principal aspect of the present invention is the use of a pliable, fire-resistant material that can be easily conformed to at least a portion of the interior bottom of a grill and at least a portion of the interior sides of a grill to thereby protect at least a portion of the interior bottom and sides of the grill from contact with dirt, drippings, grease, soot and the like during the cooking of foods. The pliable material is preferably a metal material such as aluminum, copper and/or tin; however, other types of metals can be used. Alternatively, the pliable material can be made of fire-resistant and malleable material other than metal. When aluminum is used, the thickness of the aluminum is about 0.2 millimeters to about 5 millimeters in thickness, and preferably about 0.5 to 2 millimeters in thickness. The grill liner includes a base portion and a side portion. The base portion of the grill liner is designed to protect at least a portion of the interior bottom of the grill. The base portion of the grill liner preferably includes at least one pleat to enable the base portion to be expanded to thereby at least partially conform to the interior bottom of the grill. Preferably the base portion includes a plurality of pleats so that the base portion can be conformed to the interior bottom of a wide variety of shapes and sizes of grills. The side portion of the grill liner is designed to protect at least a portion of the interior side of the grill. The side portion of the grill liner preferably includes at least one pleat to enable the side portion to be expanded to thereby at least partially conform to the interior side of the grill. Preferably the side portion includes a plurality of pleats so that the side portion can be conformed to the interior sides of a wide variety of shapes and sizes of grills. In one specific embodiment, the base portion and side portion of the grill liner include a plurality of pleats to allow the base portion to substantially completely cover the interior base of the grill and to allow the side portion to substantially completely cover the interior sides of the grill. In another specific embodiment, the pleating on the side portion of the grill liner allows the side portion to expand vertically to accommodate various depths of grills. In still another specific embodiment, the pleating on the side portion of the grill liner allows the side portion to expand both vertically and horizontally to accommodate various depths, sizes and configurations of grills.

In accordance with another aspect of the present invention, the grill liner includes a burner slot to enable the grill liner to be used in a gas and/or electric grill. The burner slot is positioned in the base portion of the liner. Preferably, the burner slot extends from one end of the base portion to an interior position on the base portion. The burner slot is also preferably positioned on the side portion of the grill liner that is adjacent to the burner slot position in the base portion. Preferably the burner slot extends the complete vertical length of the side portion, thus enabling the side position to be passed about a gas and/or electric heating element in the grill. In one specific embodiment, the burner slot includes at least one flap portion which is pliable so that the flap portion can at least be partially conformed about the base of the gas or electric burner, thereby reducing the amount of dirt, drippings, grease, soot and the like from contacting the base of the grill. Preferably, each side of the burner slot includes a pliable flap portion. The pliable flap portions are preferably made of the same material as the base and side portions of the grill liner; however, other materials can be used for the flap portions. The burner slot can be a preformed slot, can be formed just prior to use of the grill liner in the grill, or can be formed during insertion of the grill liner in the grill.

In accordance with still another aspect of the present invention, the base portion of the grill liner includes a grease opening which is designed to align with a grease trap in the grill once the grill liner is positioned in the interior of the grill. The grease opening allows grease and other liquids that have accumulated on the base portion of the grill liner to pass through the grease opening and into the grease trap, thus reducing the amount of accumulation of liquids and grease on the top surface of the grill liner thereby reducing grease flare-ups and the amount of smoke generated when cooking fatty foods. The grease opening may be a preformed opening in the base portion of the grill liner or can be inserted into the base portion of the grill liner after the grill liner has been positioned into the interior of the grill.

In accordance with a further aspect of the present invention, the grill liner includes a fuel pack which is positioned on the base portion of the grill liner. The fuel pack preferably at least partially seals combustible materials such as charcoal, wood, charcoal briquettes, wood briquettes and other combustible materials within a package for easy transport and positioning on the base portion of the grill liner. Preferably the packaging of the fuel pack can be lit so as to conveniently ignite the combustible contents of the fuel pack. In one specific embodiment, the fuel pack is packaged within the pleated grill liner such that once the grill liner is positioned in the interior base of the grill and the base portion and the side portion of the grill liner are at lest partially conformed to the interior base and sides of the grill, the fuel pack need only be lit to create a fire for the grill. This packaging arrangement provides for convenient one-stop shopping for purchasing both a grill liner and a fuel source to cook food in the grill. In another specific embodiment, the fuel pack is packaged separately from the grill liner.

In accordance with another aspect of the present invention, the grill liner is made of and/or includes a material which reflects heat inwardly and/or upwardly from the side and base portions of the grill liner, so as to concentrate the heat toward the food being cooked in the grill and to direct heat away from the bottom and sides of the grill. This heat reflecting and/or focusing attribute of the grill liner results in more uniform cooking of the foods on the grill and further reduces the amount of heat on the bottom and/or sides of the grill, thus reducing burns or the severity of burns when the bottom and/or side of the grill is contacted by a person. Preferably, the grill liner is made of a reflective material that reflects heat and/or light. One such material is aluminum; however, other materials can be used. The grill liner can include a reflective coating such as a metal and/or chemical coating to reflect heat and/or light from the surface of the grill liner.

In accordance with yet another aspect of the present invention, the grill liner is disposable so that once the use of the grill liner is complete, the grill liner can be easily removed from the grill by bending the side portion and the base portion together to form a small and convenient package which can be easily disposed or recycled. The grill liner is preferably formed of a durable material such that when the grill liner is being disposed of, the contents on the base portion and side portion of the grill liner, such as charcoal, briquettes, grease, dirt and the like can be easily disposed of without the base and/or side portions being torn by the weight of such materials. Preferably the grill liner is made of a recyclable material so that the grill liner can be recycled, thus enhancing the environmentally friendliness of the grill liner.

It is the general objective of the present invention to improve the process of preparing food in a gas, electric and/or charcoal grills.

Another objective of the present invention is to provide a grill liner fabricated out of a disposable, heat-resistant material which will protect the interior bottom and/or sides of the grill from dirt, drippings, grease, soot and the like.

Still another objective of the present invention is to provide a grill liner that is simple and easy to use.

Still yet another objective of the present invention is to provide a grill liner that is economical in cost to manufacture.

Yet another objective of the present invention is to provide a grill liner that can conform to a wide variety of grill shapes and sizes.

Still another objective of the present invention is to provide a grill liner which includes one or more pleats to allow the grill liner to at least partially conform to the interior bottom and/or sides of a grill.

Another objective of the present invention is to provide a grill liner which is of a durable and reliable construction.

Still yet another objective of the present invention is to provide a grill liner which can be at least partially conformed around a gas/electric heating element in the base of a grill.

A further objective of the present invention is to provide a grill liner which includes a grease opening to direct grease into the grease trap of a grill.

Yet a further objective of the present invention is to provide a grill liner which includes a fuel pack positioned on the top surface of the base portion of the grill liner to provide a heat source.

Still another objective of the present invention is to provide a grill liner with a prepackaged fuel source.

Yet another objective of the present invention is to provide a grill liner which directs heat and flames away from the interior base and/or sides of the grill and toward the foods being cooked on the grill.

Another objective of the invention is to provide a grill liner that is recyclable.

These and other objectives and advantages will become apparent upon the description used to illustrate the preferred embodiment of the invention when read in conjunction with the accompanied drawings.

BRIEF DESCRIPTION OF THE DRAWINGS

Reference is now be made to the drawings, which illustrate the various embodiments of the invention may take in physical form and in certain parts and arrangements of parts wherein.

DETAILED DESCRIPTION OF THE PREFERRED EMBODIMENTS OF THE INVENTION

Figure 1:
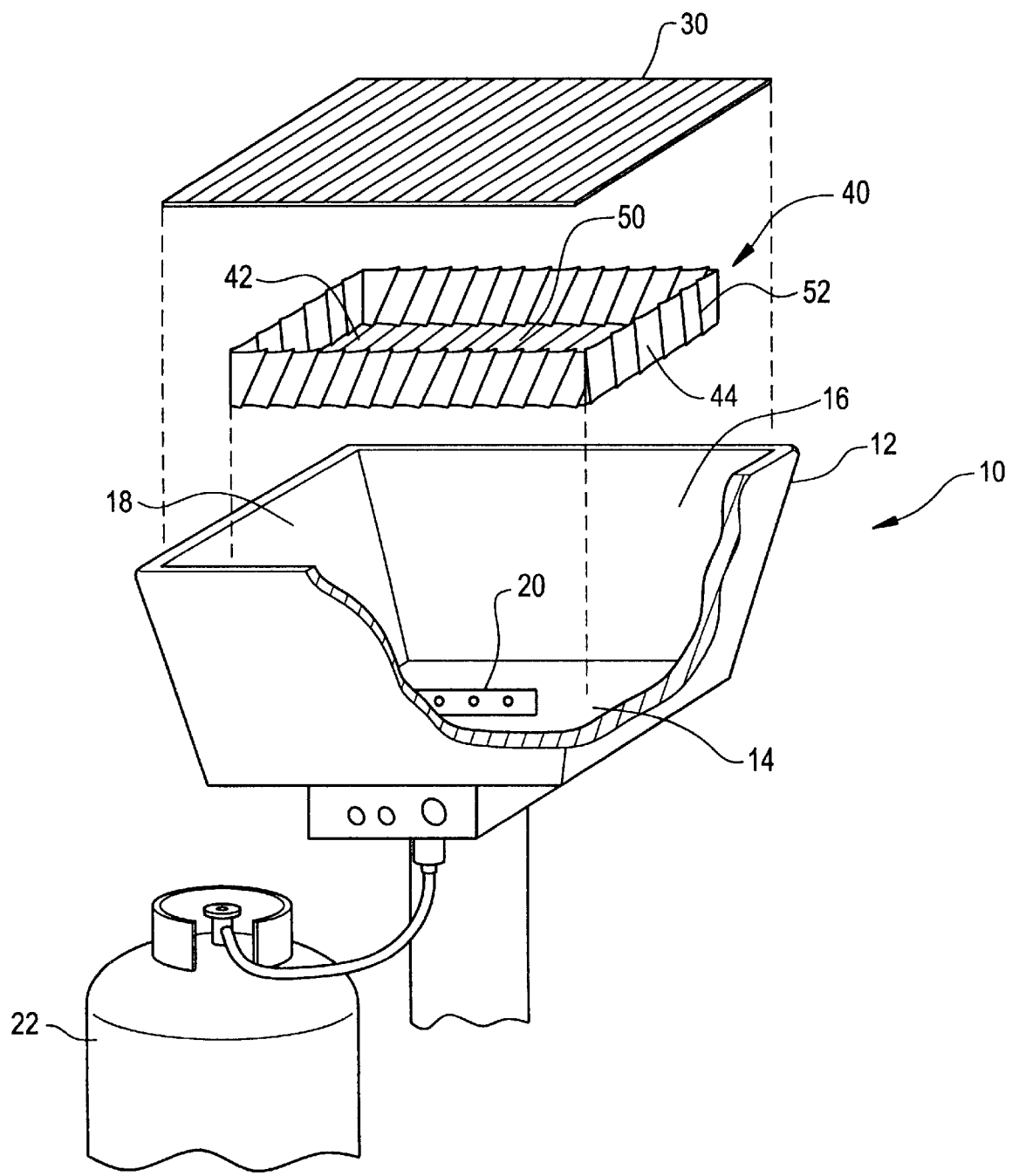
FIG. 1 is an exploded perspective view of a standard gas fire barbeque grill partially cut away to show the installation of the grill liner of the present invention.

Referring now to the drawings wherein the showings for further purpose of illustrating the preferred embodiments of the invention only and not for the purpose of limiting the same, reference is first made to FIG. 1, which illustrates a gas fire barbeque 10 which has a housing 12 with a bottom 14, side walls 16 and end walls 18. A gas burner unit 20 is located above the bottom 14 and is supplied with propane from tank 22. A food supporting grate 30 is supported horizontally in the upper portion of housing 12. The disposable grill liner 40 which is inserted into the bottom of the grill includes a base portion 42 and side portions 44. As shown in FIG. 1, both the base portion and side portion of grill liner 40 include pleats 50, 52 respectively. Pleats 50 on base portion 42 of grill liner 40 enable the grill liner to be expanded so that it can substantially conform to bottom 14 of grill 10. Likewise, pleats 52 on the side portion 44 of grill liner 40 allow the grill liner to be expanded so as to conform to side walls 16 and end walls 18 of grill 10. As can be appreciated, the number of pleated regions in base portion 42 and side portion 44 can be selected so that certain grill liners are used in certain sized grills. Furthermore the grill liner can be packaged such that the side portion is folded downwardly onto the base portion of the grill liner so as to increase the number of grill liners that can be packaged in a certain volume of packaging.

Grill liner 40 is made of a pliable, fire-resistant material such that is can be easily conformed to the bottom and sides of the grill and will also resist degradation during the cooking of foods in the grill. Preferably, grill liner 40 is made of an environmentally friendly, recyclable metal material, such as aluminum, copper and/or tin. Aluminum is the preferable material for construction of the grill liner and preferably has a thickness between about 0.2 to 5 millimeters and more preferably about 0.5 to 2 millimeters in thickness. The thickness of the grill liner material is selected so that it is both durable when used, yet pliable enough to conform to the interior surfaces of the grill. The durability of the grill liner is also selected such that once the grilling operation has been completed, the grill liner can be conveniently folded up and disposed of without tearing during disposal thus preventing ash, soot, food particles, grease and the like from spilling into the base of the grill when the grill liner is being removed.

Pleats 50 and 52 formed in grill liner 40 can be formed by any standard pleating process and will not be further described herein. The pleats are preferably formed into the side portion and base portion of the grill liner to enable the pleated regions to be easily expanded when the grill liner is being conformed to the sides and base of the grill.

Figure 2:
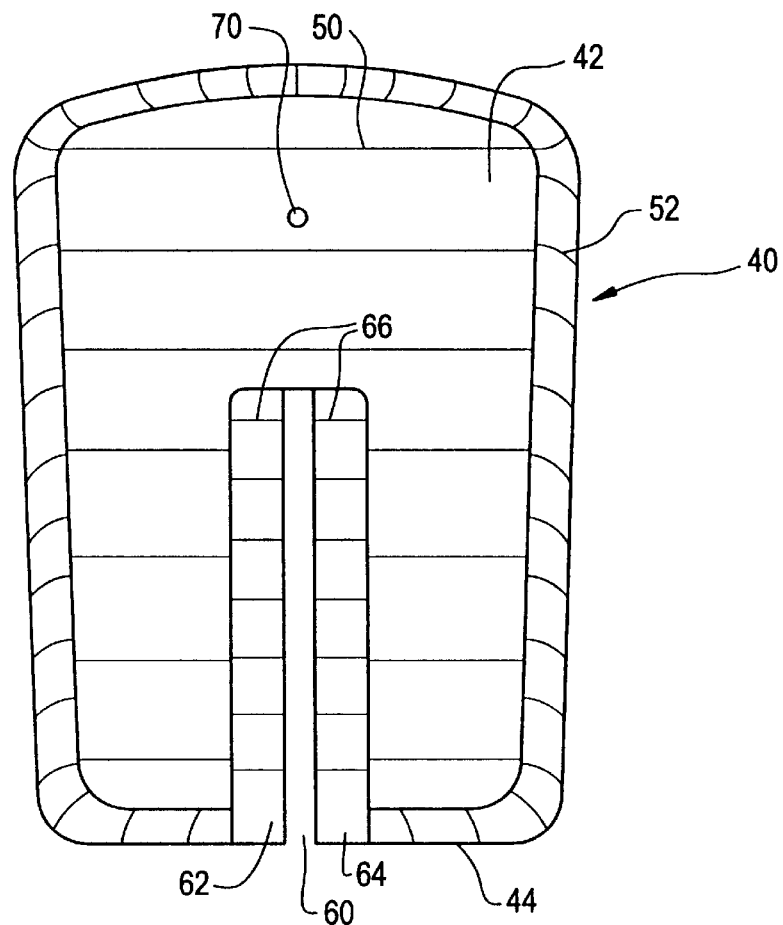
FIG. 2 is a top perspective view of the grill liner, which includes a burner slot.
Figure 3:
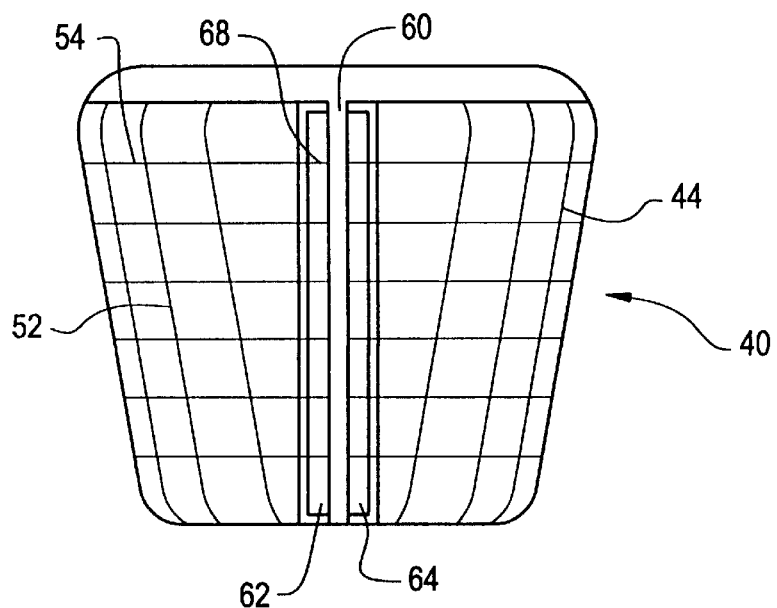
FIG. 3 is a side perspective view of FIG. 2, illustrating the burner slot extending along the side portion of the grill liner.

Referring now to FIGS. 2 and 3, an alternate embodiment of the grill liner is shown. Grill liner 40 includes a burner slot 60 to enable the grill liner to be inserted into a grill which includes a gas or electric heating element mounted into the interior bottom of the grill. As shown in FIG. 2, slot 60 extends from one edge of base portion 42 to about the center of the base portion and forms an essentially straight and rectangular shaped slot. As can be appreciated, other slot designs can be used. The length of the slot can be longer or shorter to accommodate various types of grills. The width of the slot is preferably about 0.1 to 2 inches; however, other widths can be used to accommodate certain types of grills. Attached to the sides of slot 60 are two side flaps 62 and 64. These side flaps are designed to be conformed to the base of the burner so as to cover the exposed portions of the base of the burner and protect the bottom of the grill from dirt, drippings, grease, soot or the like near and around the base of the burner.

Referring now to FIG. 3, side portion 44 of grill liner 40 illustrates slot 60 extending the complete vertical distance of the side portion. The configuration of slot 60 in both the side portion and base portion of the grill liner 40 enables the grill liner to be positioned about the gas or electric burner in the grill, thus conveniently enabling the grill liner to be positioned in the grill. Preferably, burner slot 60 is preformed in the grill liner prior to insertion in the grill.

An additional feature of the grill liner is illustrated in FIG. 3, in that both horizontal and vertical pleats are present in the side portion of the grill liner. Vertical pleats 52 enable the side portion to be expanded horizontally to conform to the inside surfaces of the grill. Vertical pleats 54 on the side portion and vertical pleats 68 on flap portions 62,64 enable the grill liner be extended vertically to conform to various depths of the grill, thereby enabling the grill liner to conform to substantially the complete interior side surfaces of the grill. Flaps 62,64 include pleats 66 to enable the flaps to extend vertically.

Referring again to FIG. 2, a grease opening 70 is positioned in base portion 42 of grill liner 40 to enable grease and other liquids accumulating on the base portion of the grill liner to pass into a grease trap of a standard grill (not shown). Grease opening 70 is positioned in the base portion of the grill liner so that it is substantially aligned with the grease trap opening. Grease opening 70 can be a preformed opening or be formed after the grill liner has been positioned in the base of grill.

Figure 4:
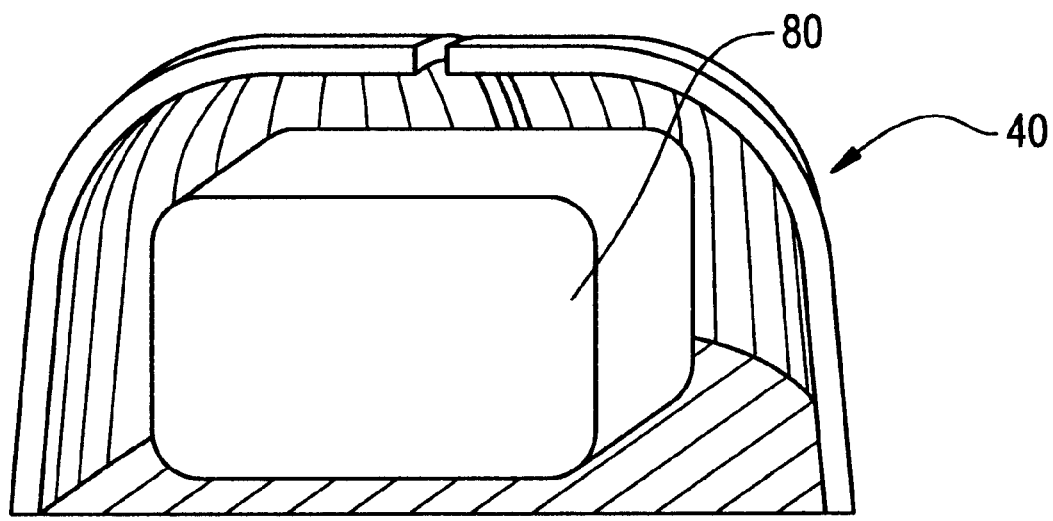
FIG. 4 is a side cut away perspective view of the prepackaged, unexpanded gas grill liner which includes a fuel cell within the grill liner.

Referring now to FIG. 4, an additional embodiment of the invention is disclosed wherein a fuel cell 80 is packaged within the unexpanded grill liner 40. The fuel cell is preferably a package of material which includes wood, paper, charcoal and the like to form a fire for grilling or heating purposes. Preferably the fuel cell 80 is packaged in a flammable package material so that the package material merely need be lit to ignite the contents of the fuel cell. Preferably, the disposable grill liner includes an at least partially sealed fuel cell or fuel pack positioned on the base portion of the disposable grill liner, and the fuel cell or fuel pack includes a combustible material consisting of charcoal, wood and/or paper. In operation, grill liner 40 and fuel cell 80 are placed into the interior of a grill and side portion 44 is folded away from the base portion and fuel cell and the base and side portion are conformed to the interior of the grill. Once the grill liner has been conformed to the interior surfaces of the grill, the fuel cell is lit to begin cooking foods on the grill.

Grill liner 40 is designed to be easily disposable so that when the barbeque or heating operation is complete, the side and base portions of the grill liner are folded together to be either recycled or disposed of, thus leaving a clean grill environment after use.

The invention has been described with reference to a preferred embodiment and alternates thereof, it is believed that many modifications and alterations of the embodiments discussed herein will readily suggest themselves to those skilled in the art upon reading and understanding the detailed description of the invention. It is intended to include all such modifications and alterations and so far as they come within the scope the present invention.

What is claimed is:

1. A disposable grill liner for a barbecue or broiler grill comprising a pliable metal sheet having a base portion and a side portion, said base portion including at least one expandable pleat enabling the base portion to at least partially conform to the bottom of the grill and a burner slot adapted to receive at least a portion of a burner of said grill, said burner slot partially formed in said base portion and said side portion, said side portions including at least one expandable pleat enabling said side portion to at least partially conform to the side of said grill.

2. The disposable grill liner as defined in claim 1, wherein said base portion includes a plurality of expandable pleats.

3. The disposable grill liner as defined in claim 1, wherein said side portion includes a plurality of expandable pleats.

4. The disposable grill liner as defined in claim 2, wherein said side portion includes a plurality of expandable pleats.

5. The disposable grill liner as defined in claim 2, wherein said base portion is expandable to substantially conform to the complete base of said grill.

6. The disposable grill liner as defined in claim 3, wherein said side portion is expandable to substantially conform to the complete sides of said grill.

7. The disposable grill liner as defined in claim 1, wherein said burner slot includes at least one flap portion that at least partially conforms about a burner of said grill.

8. The disposable grill liner as defined in claim 1, including a grease hole in said base portion to allow grease in said base portion to flow into an opening in said grill.

9. The disposable grill liner as defined in claim 1, including an at least partially sealed fuel pack positioned on said base portion, said fuel pack including a combustible material consisting of charcoal, wood, paper and combinations thereof.

10. A disposable grill liner for a barbecue or broiler grill comprising a pliable aluminum sheet having a base portion, a side portion and a burner slot positioned in a part of said base portion and said side portion, said base portion including a plurality of expandable pleats enabling the base portion to at least partially conform to the bottom of the grill, said side portion including a plurality of pleats enabling said side portion to at least partially conform to the side of said grill, said burner slot adapted to receive at least a portion of a burner of said grill and including a plurality of pliable flap portions adapted to at least partially form about the burner of said grill.

11. The disposable grill liner as defined in claim 10, wherein said base portion is expandable to substantially conform to the complete base of said grill and said side portion is expandable to substantially conform to the complete sides of said grill.

12. The disposable grill liner as defined in claim 10, including a grease hole in said base portion to allow grease in said base portion to flow into an opening in said grill.

13. The disposable grill liner as defined in claim 10, including an at least partially sealed fuel pack positioned on said base portion, said fuel pack including a combustible material consisting of charcoal, wood, paper and combinations thereof.

14. A disposable grill liner comprising a pliable, heat-resistant sheet material having a base portion and a side portion and a burner slot partially formed in said base portion and said side portion, said side portion including at least one expandable pleat enabling said side portion to at least partially conform to the side of said grill, said burner slot adapted to receive at least a portion of a burner of said grill.

15. The disposable grill liner as defined in claim 14, wherein said base portion including at least one expandable pleat enabling said base portion to at least partially conform to the bottom of said grill.

16. The disposable grill liner as defined in claim 15, wherein said base portion includes a plurality of expandable pleats.

17. The disposable grill liner as defined in claim 15, wherein said side portion includes a plurality of expandable pleats.

18. The disposable grill liner as defined in claim 16, wherein said base portion is expandable to substantially conform to the complete base of said grill.

19. The disposable grill liner as defined in claim 18, wherein said side portion is expandable to substantially conform to the complete sides of said grill.

20. The disposable grill liner as defined in claim 14, wherein said sheet material includes a metal material selected from the group consisting of aluminum, copper, tin and combinations thereof.

21. The disposable grill liner as defined in claim 14 wherein said burner slot includes at least one flap portion that at least partially conforms about said burner of said grill.

22. The disposable grill liner as defined in claim 14, including a grease hole in said base portion to allow grease in said base portion to flow into an opening in said grill.

23. The disposable grill liner as defined in claim 14, including an at least partially sealed fuel pack positioned on said base portion, said fuel pack including a combustible material consisting of charcoal, wood, paper and combinations thereof.

24. A disposable grill liner for a barbecue or broiler grill comprising a pliable metal sheet having a base portion and a side portion, said base portion including at least one expandable pleat enabling the base portion to at least partially conform to the bottom of the grill and a grease hole in said base portion to allow grease in said base portion to flow into an opening in said grill, said side portions including at least one expandable pleat enabling said side portion to at least partially conform to the side of said grill.

25. The disposable grill liner as defined in claim 24, wherein said base portion includes a plurality of expandable pleats.

26. The disposable grill liner as defined in claim 24, wherein said side portion includes a plurality of expandable pleats.

27. The disposable grill liner as defined in claim 25, wherein said side portion includes a plurality of expandable pleats.

28. The disposable grill liner as defined in claim 24, including a burner slot adapted to receive at least a portion of a burner of said grill, said burner slot partially formed in said base portion and said side portion.

29. The disposable grill liner as defined in claim 28, wherein said burner slot includes at least one flap portion that at least partially conforms about a burner of said grill.

30. The disposable grill liner as defined in claim 24, including an at least partially sealed fuel pack positioned on said base portion, said fuel pack including a combustible material consisting of charcoal, wood, paper and combinations thereof.

31. A disposable grill liner for a barbecue or broiler grill comprising a pliable metal sheet having a base portion and a side portion and an at least partially sealed fuel pack positioned on said base portion, said fuel pack including a combustible material consisting of charcoal, wood, paper and combinations thereof, said base portion including at least one expandable pleat enabling the base portion to at least partially conform to the bottom of the grill, said side portions including at least one expandable pleat enabling said side portion to at least partially conform to the side of said grill.

32. The disposable grill liner as defined in claim 3, wherein said base portion includes a plurality of expandable pleats.

33. The disposable grill liner as defined in claim 31, wherein said side portion includes a plurality of expandable pleats.

34. The disposable grill liner as defined in claim 32, wherein said side portion includes a plurality of expandable pleats.

35. The disposable grill liner as defined in claim 31, including a burner slot adapted to receive at least a portion of a burner of said grill, said burner slot partially formed in said base portion and said side portion.

36. The disposable grill liner as defined in claim 35, wherein said burner slot includes at least one flap portion that at least partially conforms about a burner of said grill.

37. The disposable grill liner as defined in claim 31, including a grease hole in said base portion to allow grease in said base portion to flow into an opening in said grill.

38. A disposable grill liner for a barbecue or broiler grill, said barbecue or broiler grill having a base and at least one side, said grill liner comprising a pliable metal sheet having a base portion and a side portion, said base portion including at least one expandable pleat enabling the base portion to at least partially expand longitudinally along the length of the base of the grill, said side portion including at least one expandable pleat enabling said side portion to at least partially expand longitudinally along the side of said grill, said side portion including at least one expandable pleat enabling said side portion to at least partially expand vertically along the side of said grill.

39. The disposable grill liner as defined in claim 38, wherein said base portion includes a plurality of expandable pleats.

40. The disposable grill liner as defined in claim 38, wherein said side portion includes a plurality of expandable pleats.

41. The disposable grill liner as defined in claim 38, wherein said side portion includes a plurality of expandable pleats.

42. The disposable grill liner as defined in claim 38, wherein said base portion is expandable to substantially conform to the complete base of said grill.

43. The disposable grill liner as defined in claim 38, wherein said side portion is expandable to substantially conform to the complete longitudinal length and vertical height of said sides of said grill.

44. The disposable grill liner as defined in claim 38, including a burner slot adapted to receive at least a portion of a burner of said grill, said burner slot partially formed in said base portion and said side portion.

45. The disposable grill liner as defined in claim 44, wherein said burner slot includes at least one flap portion that at least partially conforms about a burner of said grill.

46. The disposable grill liner as defined in claim 38, including a grease hole in said base portion to allow grease in said base portion to flow into an opening in said grill.

47. The disposable grill liner as defined in claim 40, including an at least partially sealed fuel pack positioned on said base portion, said fuel pack including a combustible material consisting of charcoal, wood, paper and combinations thereof.

48. The disposable grill liner as defined in claim 38, wherein said sheet material includes a metal material selected from the group consisting of aluminum, copper, tin and combinations thereof.

* * * * *